US011280419B2

(12) United States Patent
Friedlein et al.

(10) Patent No.: US 11,280,419 B2
(45) Date of Patent: Mar. 22, 2022

(54) HIGH-PRESSURE SAFETY VALVE

(71) Applicant: Buerkert Werke GmbH & Co. KG, Ingelfingen (DE)

(72) Inventors: Daniel Friedlein, Ingelfingen (DE); Mathias Ganske, Ingelfingen (DE); Michael Hannig, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 63 days.

(21) Appl. No.: 16/596,844

(22) Filed: Oct. 9, 2019

(65) Prior Publication Data
US 2020/0109790 A1    Apr. 9, 2020

(30) Foreign Application Priority Data

Oct. 9, 2018  (DE) .................... 10 2018 124 864.4

(51) Int. Cl.
*F16K 17/02*    (2006.01)
*F16K 31/06*    (2006.01)

(52) U.S. Cl.
CPC ........ *F16K 17/025* (2013.01); *F16K 31/0675* (2013.01)

(58) Field of Classification Search
CPC .... F16K 17/025; F16K 17/10; F16K 31/0675; F16K 31/082; F16K 31/406; F16K 31/0644
See application file for complete search history.

(56) References Cited

U.S. PATENT DOCUMENTS

| 3,896,840 | A | * | 7/1975 | Andersson | .............. F16K 31/42 |
|  |  |  |  |  | 137/219 |
| 4,044,794 | A | * | 8/1977 | Matthews | ............ G05D 16/163 |
|  |  |  |  |  | 137/613 |
| 4,771,808 | A | * | 9/1988 | Rodger | ............... F16K 31/0658 |
|  |  |  |  |  | 137/613 |
| 5,967,186 | A | * | 10/1999 | Grueninger | ......... F16K 31/0627 |
|  |  |  |  |  | 137/625.65 |
| 8,505,573 | B2 | * | 8/2013 | Herbert | .................... F16K 37/00 |
|  |  |  |  |  | 137/554 |
| 8,597,849 | B2 | * | 12/2013 | Junge | ................ H01M 8/04089 |
|  |  |  |  |  | 429/446 |
| 2007/0241298 | A1 |  | 10/2007 | Herbert et al. |  |

FOREIGN PATENT DOCUMENTS

| DE | 2037774 A1 | 2/1972 |
| DE | 102013018855 A1 | 5/2015 |
| EP | 1316749 A2 | 6/2003 |
| GB | 1348671 A | 3/1974 |

\* cited by examiner

*Primary Examiner* — Eric Keasel
(74) *Attorney, Agent, or Firm* — Dilworth IP, LLC

(57) ABSTRACT

The invention relates to a safety valve comprising a pilot valve element, a pilot valve actuator, a main valve element cooperating with a main valve seat, a permanent magnet being provided which is associated with the main valve element and which is adapted to hold the latter in an open position, and a main valve actuator being provided which cooperates with the main valve element.

10 Claims, 5 Drawing Sheets

HIGH-PRESSURE SAFETY VALVE

The invention relates to a safety valve, in particular to a high-pressure safety valve, comprising a pilot valve element, a pilot valve actuator, and a main valve element cooperating with a main valve seat.

BACKGROUND TO THE INVENTION

A safety valve of this type is a so-called piloted valve or a servo valve, by means of which fluids that are under a high pressure can be reliably controlled without the valve actuator having to have a high performance. Piloted valves are generally known.

The drawback of known solenoid valves which are normally closed consists in that they are held in the open switching position when they are supplied with current and fall back into the closed switching position with spring force when they become currentless.

This can be illustrated on the basis of the case of application of a high-pressure safety valve which is used, for example, as part of a fire extinguishing system in a train. In the event of a fire, the valve is opened to provide water for extinguishing the fire. If a power failure occurs as a result of the fire, the valve actuator cannot hold the valve element in the open state; the solenoid valve is set into its closed switching state in the absence of current. This would interrupt the supply with fire-extinguishing water.

Also known are so-called impulse valves, which can be brought from a switching state to another switching state by an impulse of a valve actuator. Examples can be found in documents DE 203 77 74 and EP 1 316 749. In these valves, an impulse of a solenoid coil provides for the opening. The valve is returned to its closed position only after a further impulse. However, conventional impulse solenoid valves are not suitable for high-pressure applications due to a lack of sufficient magnetic force.

The object of the invention is to create a high-pressure safety valve which, after being moved to the open position, remains open even in the event of a power failure. The valve should be suitable for fluid pressures up to approx. 350 bar and nominal widths up to approx. 25 mm.

BRIEF SUMMARY OF THE INVENTION

According to the invention, to achieve this object, provision is made in a safety valve of the type initially mentioned for a permanent magnet which is associated with the main valve element and is adapted to hold it in an open position, a main valve actuator cooperating with the main valve element being provided. The permanent magnet "catches" the main valve element when it is moved to the open position and ensures that it remains in this position even if the safety valve becomes currentless. In other words, the main valve element cannot unintentionally return to the closed position by an interruption of the power supply to the safety valve. The main valve actuator permits the main valve element to be returned to the closed position by means of an external control pulse.

Preferably, it is provided that the main valve actuator comprises a solenoid coil, a movable core of ferromagnetic material, a fixed plug of ferromagnetic material, a yoke and the permanent magnet. Once the main valve element is brought in the open position, the movable core closes the magnetic circuit by a contact with the fixed core due to the action of the permanent magnet, such that the main valve element is held in the open position. The movable core is released from the fixed plug only when the main valve actuator is again supplied with current.

The main valve element may be rigidly coupled to the core of the main valve actuator such that a mechanically simple design is achieved.

Alternatively, it may be provided that the main valve element is flexibly coupled to the core of the main valve actuator. The main valve element is thus prevented from inadvertently sticking in the open position if it is briefly lifted off from the main valve seat by a pressure surge in the fluid line.

A further advantage of the loose coupling consists in that the valve can be operated like a normal servo valve without the "catching means" in case of service or during daily tests. In this case, the impulse coil is simply not supplied with current. If necessary, the catching means can be "armed" by also supplying the impulse coil with current when the valve is opened.

As an alternative to a main valve actuator, a mechanical release mechanism can be provided by means of which the main valve element can be freed from the open position. This embodiment distinguishes itself by low manufacturing costs but requires manual intervention by an operator to return the safety valve to a closed state once it has been opened.

As a further alternative, it is possible to completely dispense with the possibility of returning the main valve element to the closed position. In this case, the safety valve has to be replaced once it has been opened.

In the embodiment including a mechanical release mechanism and in the embodiment having no release mechanism, it may be provided that the main valve element is made of a ferromagnetic material or is firmly connected to a component made of a ferromagnetic material. No adjustable core is required; rather, the main valve element can be "caught" directly by the permanent magnet.

BRIEF DESCRIPTION OF THE DRAWINGS

The invention is described below with reference to different embodiments which are represented in the accompanying drawings in which.

DETAILED DESCRIPTION OF THE INVENTION

Figure 1:
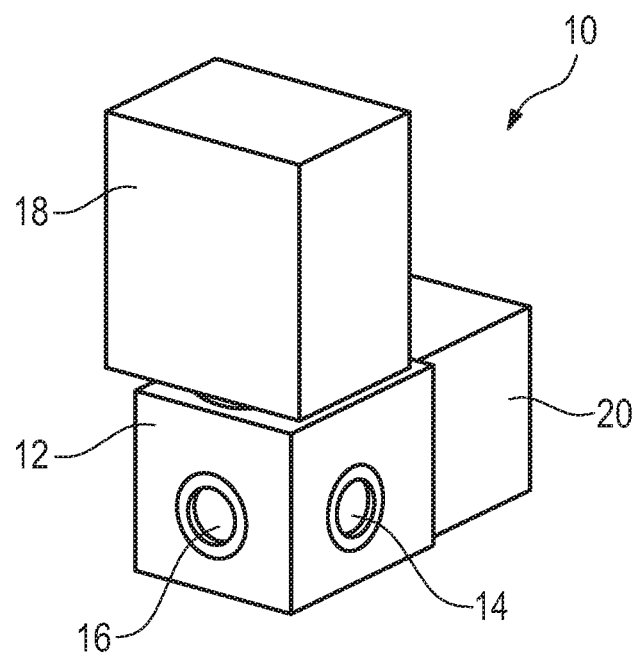
FIG. 1 shows a safety valve according to the invention in a schematic perspective view.

FIG. 1 shows a high-pressure safety valve 10 which comprises a fluid housing 12 having a fluid inlet 14 and a fluid outlet 16. A first valve actuator 18 and a second valve actuator 20 are arranged on the fluid housing 12.

The two valve actuators 18, 20 are electromagnetic valve actuators.

The high-pressure safety valve serves to switch a fluid connection between the fluid inlet 14 and the fluid outlet 16, the fluid pressures being adapted to be in the order of 350 bar. The nominal widths of the fluid connections are in the order of 25 mm.

In the embodiment shown in FIG. 1, the fluid inlet 14 and the fluid outlet 16 are arranged at right angles to each other in the fluid housing 12. Furthermore, the first valve actuator 18 is arranged perpendicular to the plane in which the fluid inlet 14 and the fluid outlet 16 extend. The second valve actuator 20 is arranged in the plane of the fluid inlet 14 and the fluid outlet 16.

However, other geometries are in principle also conceivable. The first and the second valve actuators 18 and 20 can for example also be opposite each other in a plane, and the fluid inlet 14 and the fluid outlet 16 extend opposite each other in a plane perpendicular thereto.

Figure 2:
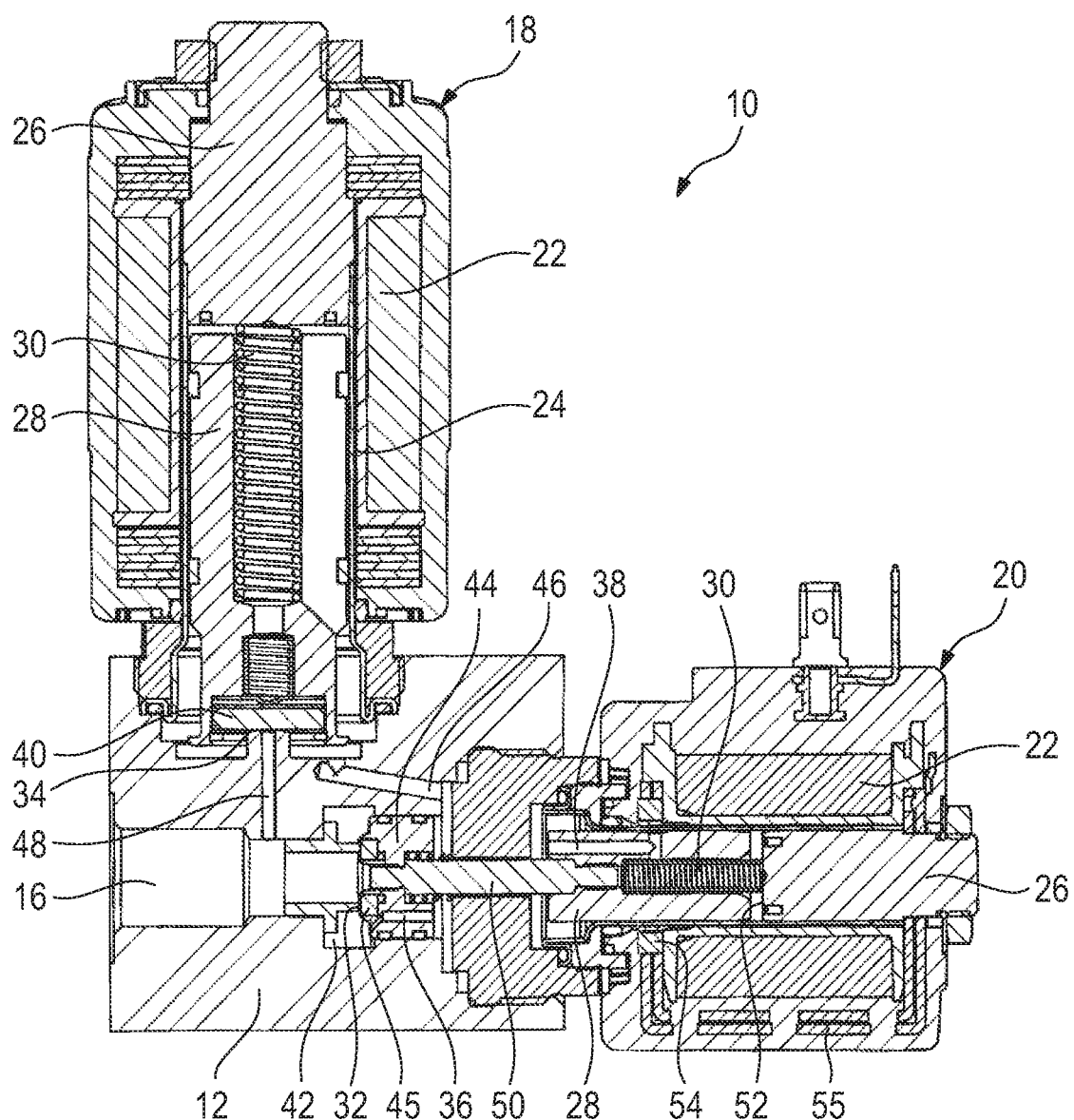
FIG. 2 shows a safety valve according to one embodiment of the invention in a sectional view.

FIG. 2 shows the high-pressure safety valve of FIG. 1 in a section. The fluid inlet 14 is not visible in this representation. It is located in a plane perpendicular to the paper plane.

The two valve actuators 18, 20 each have a coil 22, a core guiding tube 24, a plug 26, a core 28 and a spring 30. The core 28 is displaceably arranged in the core guiding tube 24. Similar components are marked with identical reference numbers in both valve actuators.

A main valve seat 32 and a pilot valve seat 34 are arranged in the fluid housing 12.

A main valve element 44 cooperates with the main valve seat 32 to realize (along with fluid ducts in the fluid housing 12) the actual valve function of the high-pressure safety valve 10, i.e. the interruption and opening of the fluid connection between the fluid inlet 14 and the fluid outlet 16. The valve actuator 20 associated with the main valve element constitutes a main valve actuator.

A pilot valve element 40 cooperates with the pilot valve seat 34 to realize (along with fluid ducts in the fluid housing 12, here more specifically a pilot duct 46 and a relief bore 48) a pilot valve for the main valve element. The valve actuator 18 associated with the pilot valve element 40 constitutes a pilot valve actuator.

FIG. 2 shows both the main valve seat 32 and the pilot valve seat 34 in a closed switching position.

The pilot valve is normally closed, i.e. a spring 30 pushes a core 28 of the pilot valve actuator away from a plug 26 towards the pilot valve seat 34. The pilot valve element 40 is arranged on the side of the core 28 facing the pilot valve seat 34 such that it is urged against the pilot valve seat 34 by the spring 30. In the currentless state of the pilot valve actuator, the pilot valve is closed; the pilot valve element seals the pilot valve seat 34 in a tight manner.

The main valve element 44 is displaceable between a closed position, in which it is in tight-fitting contact with the main valve seat 32, and an open position, in which the fluid inlet 14 is fluidically connected to the fluid outlet 16 via a valve chamber 42, such that medium then flows from the fluid inlet 14 via the valve chamber 42 to the fluid outlet 16.

The main valve element 44 is here configured as a piston which is displaceable in the valve chamber 42.

A seat seal 45 cooperating with the main valve seat 32 and improving the sealing may be arranged in the main valve element 44.

If medium (e.g. water) is present at the fluid inlet 14, this medium first flows into a valve chamber 42, in which the main valve seat 32 and the main valve element 44 are arranged.

In the currentless initial state, the pilot valve seat 34 and also the main valve seat 32 are closed. The medium that is present flows from the fluid inlet 14 into the valve chamber 42, and through a pressure compensation hole 36 to the side of the main valve element 44 which is arranged behind the main valve element 44 as seen from the main valve seat 32. The medium thus presses on the side of the main valve element 44 facing away from the main valve seat 32 and thus supports the tightness of the safety valve 10.

The pressure compensation hole 36 is here arranged in the main valve element 44. However, other arrangements are generally also possible here.

If a coil 22 of the first valve actuator 18 is supplied with current, the pilot valve seat 34 is released by attracting the core 28 into the coil 22. As a result, medium flows from the valve chamber 42 via the pilot duct 46 and the relief duct 48 to the fluid outlet 16. As the medium flows off behind the piston/the main valve element 44 (the flow cross-section is larger than the flow cross-section of the pressure compensation hole 36), the piston is moved away from the main valve seat 32, and the main valve seat 32 is opened. This state is shown in FIGS. 3a and 3b.

The function described up to this point is known from servo-controlled valves having a coil.

Figure 3:
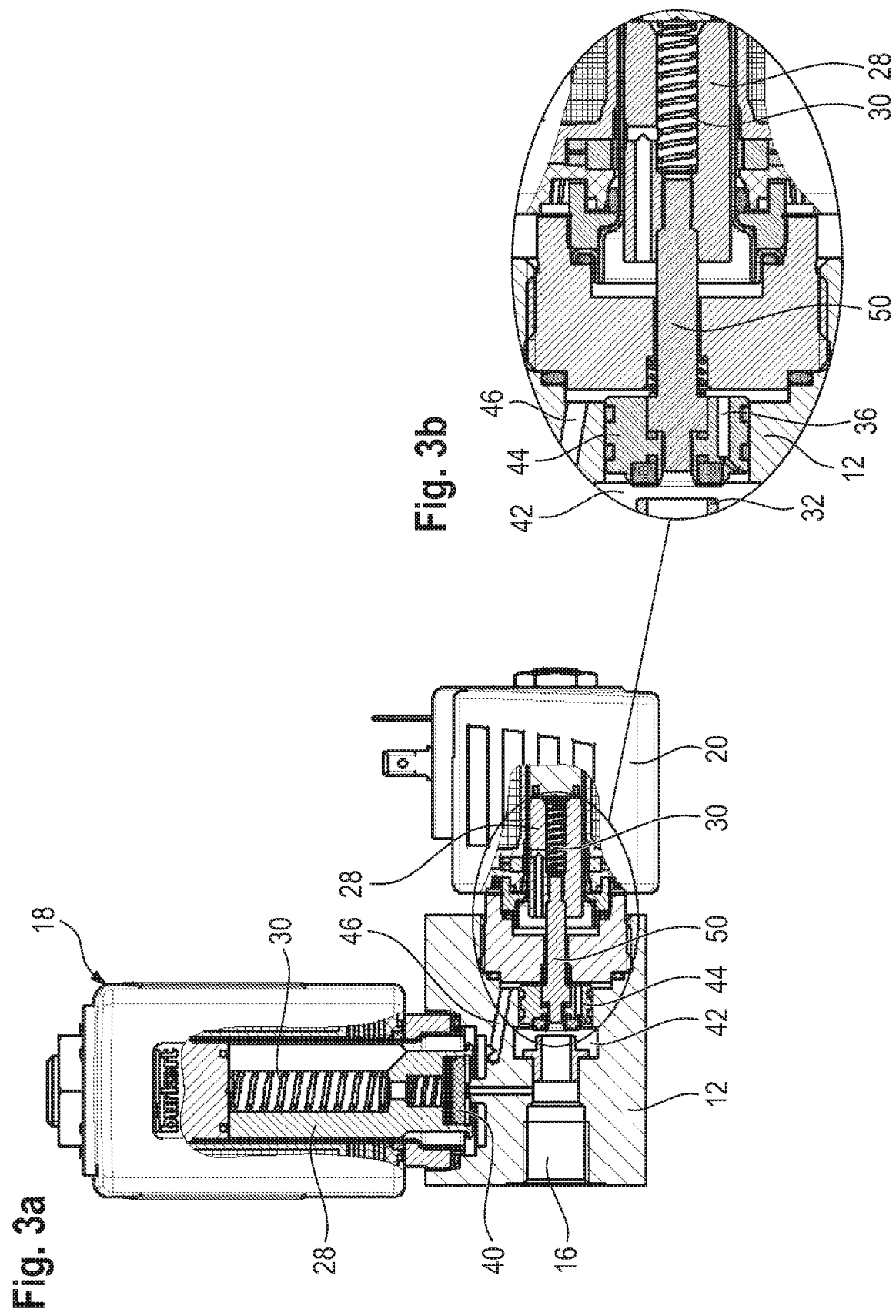
FIG. 3*a* shows the safety valve of FIG. 2 in a first state.
FIG. 3*b* shows a detail of FIG. 3*a* on an enlarged scale.
Figure 4:
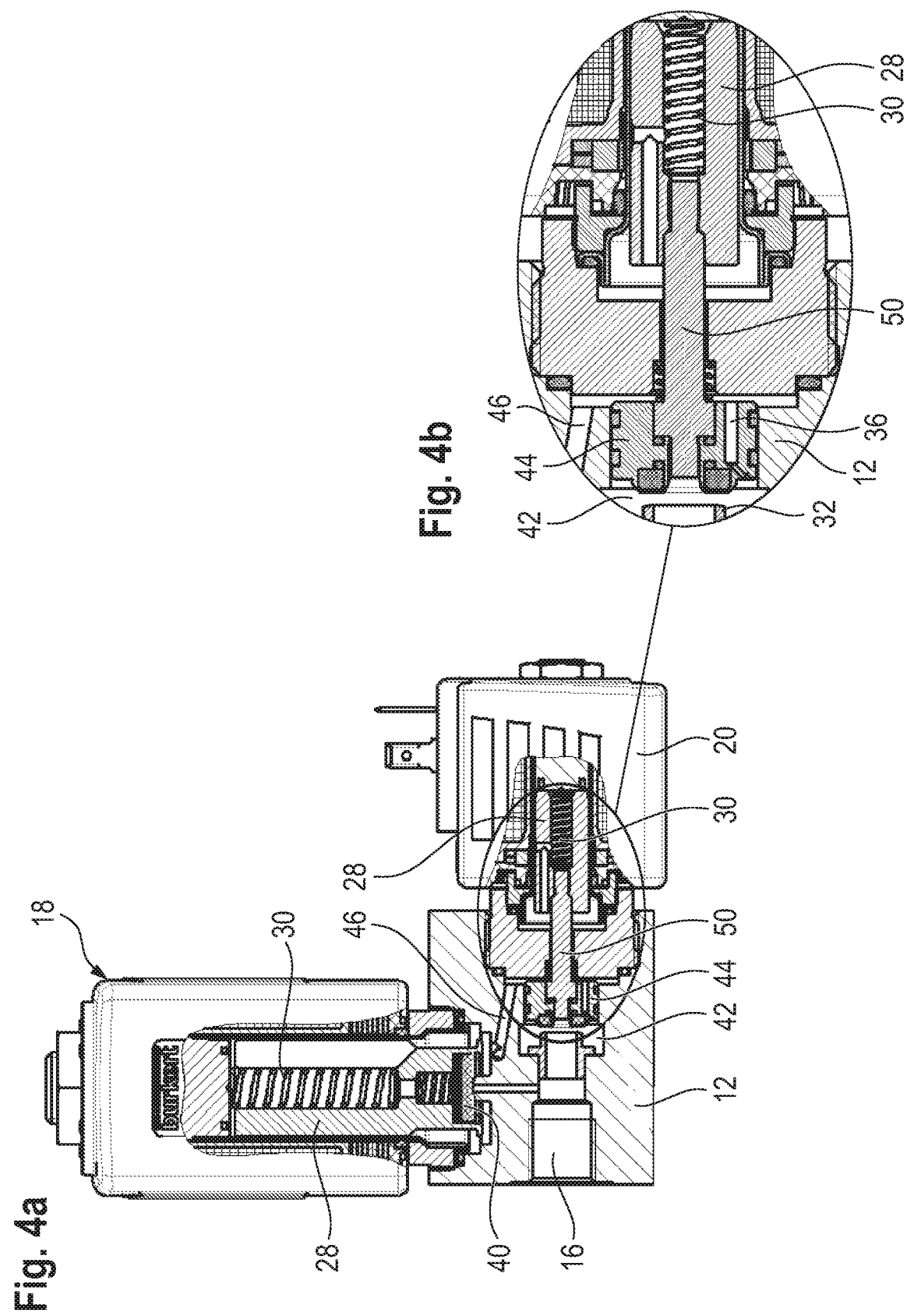
FIG. 4*a* shows the safety valve of FIG. 2 in a second state.
FIG. 4*b* shows a detail of FIG. 4*a* on an enlarged scale.

In the embodiment shown in FIGS. 2 to 4, the main valve element 44 is firmly connected to the core 28 of the second valve actuator 20 by means of a spindle 50. In other words, the spindle 50 is firmly connected to the main valve element 44 at one end and firmly connected to the core 28 at a second end. The spindle 50 is here screwed into the main valve element 44 and the core 28.

A permanent magnet 54 is arranged in the iron circuit of the coil 22 which contains a yoke 55.

If after opening the pilot valve the main valve element 44 is shifted from the main valve seat 32 in the direction of the plug 26 of the second valve actuator 20, the core 28 thus also moves simultaneously further into the interior of the coil 22 of the main valve actuator 20 up to a stop 52 at the plug 26. The magnetic circuit is thus closed, and the core 28 is held in contact with the plug 26.

Due to the magnetic force of the permanent magnet 54, the core 28 is then held in a currentless manner at the stop 52 in the main valve actuator 20 once the safety valve 10 has been opened, even if the pilot valve seat 34 should be closed (FIG. 4). The main valve element 44 with its seat seal 45 thus remains spaced apart from the main valve seat 32.

Therefore, the effect of the permanent magnet 54 is that after a single switching of the safety valve 10, the main valve seat 32 then remains permanently open by switching the pilot valve, regardless of whether the pilot valve seat 34 still remains open or is closed. This is important, for example, in the event of a power failure. Without the permanent magnet 54, the pilot valve would first close the pilot valve seat 34 in the event of a power failure, and the main valve seat 32 would thus also be shifted to its closed position.

Using the second valve actuator 20, the safety valve 10, if required, can be brought back to a closed state after a single switching.

If the coil 22 of the main valve actuator 20 is supplied with current, it acts against the magnetic force of the permanent magnet 54. As a result, the core 28 falls off the plug 26, and the main valve element 44 is moved with spring force in the direction of the main valve seat 32, such that the main valve seat 32 of the safety valve 10 is closed again.

The described function of the second actuator 20 is particularly advantageous in order to be able to run test cycles of the safety valve 10.

Figure 5:
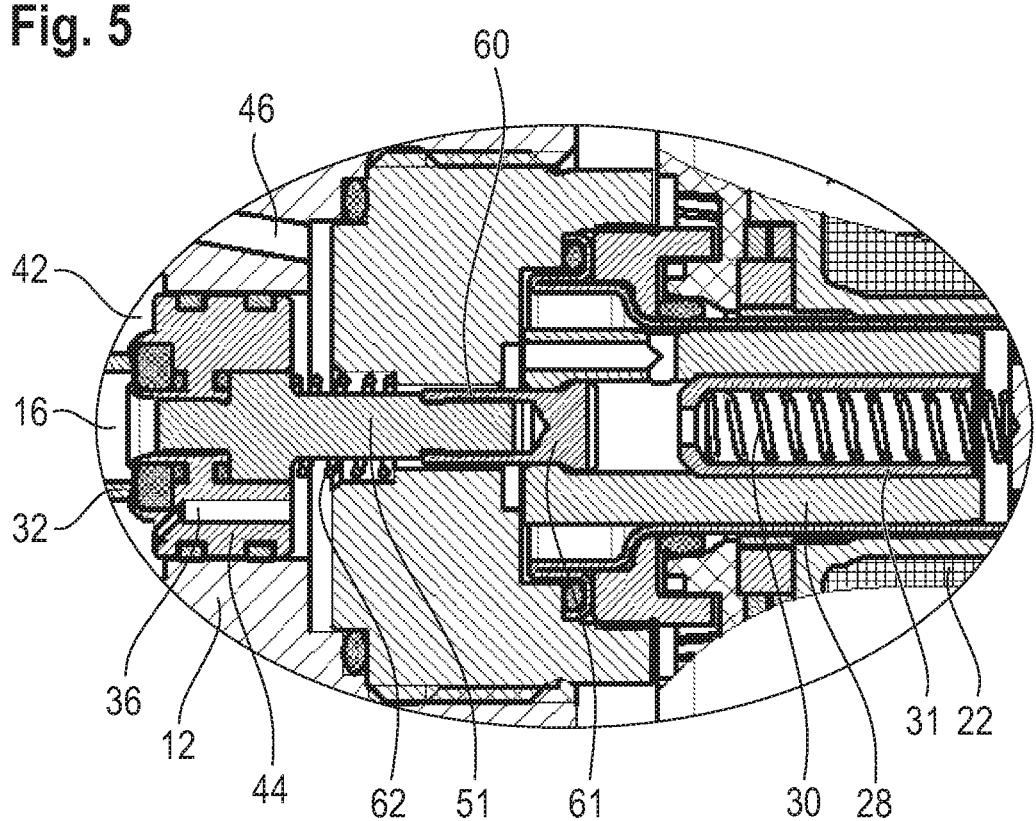
FIG. 5 shows a second embodiment of a safety valve according to the invention, of which merely a detail that is comparable with the detail shown in FIGS. 3*b* and 4*b* is shown.

FIGS. 5a and 5b describe a second embodiment. The same reference numbers are used for the components known from the first embodiment, and in this respect, reference is made to the above explanations.

The difference between the first and the second embodiment is that in the second embodiment, the spindle 51 is only firmly connected to the main valve element 44 (e.g. screwed in), but is not firmly/rigidly connected to the core 28, as shown in the detailed view in FIG. 5b. Instead, a driving mechanism 60 is used.

The loose coupling is achieved in that the spindle 51 is not firmly connected to the core 28 and the spring 30 is accommodated in a spring housing 31 within the core 28, such that it is not in direct contact with the spindle 51. The spindle 51 is arranged inside the core 28 so as to be somewhat displaceable.

The driving mechanism has an extended head 61 which engages in a bore in the core 28 and is driven in one direction (when the core 28 moves to the right in FIG. 5) by a constriction at the end of the bore. If the main valve element 44 is moved to the right, the head 61 lifts off from the constriction and is pushed into the core 28 without the core 28 being displaced.

Due to the loose coupling by the driving mechanism 60, the safety valve 10 only opens, i.e. the main valve seat 32 is only opened when not only the pilot valve seat 34 is open, but also the second valve actuator 20 is briefly supplied with current. The core 28 of the second valve actuator 20 is thus pulled towards the plug 26, and the main valve seat 32 is therefore opened. If the main valve element 44 is actually briefly lifted off from the main valve seat (e.g. by a brief pressure surge in the fluid line), this happens without the core 28 being displaced. Therefore, the permanent magnet cannot "catch" the core 28 and thus the main valve element 44; rather, the main valve element 44 returns to the closed position under the action of a spring 62 by means of which it is urged towards the main valve seat 32.

The further operating principle is identical to the first example embodiment. The core 28 is then held by the permanent magnet 54 at the stop 52 and changes its position only by a subsequent current impulse on the coil 22 of the main valve actuator 20.

In both example embodiments, the main valve element 44 is configured as a piston which is preferably formed of metal, for example of brass or stainless steel. The core 28 must be fabricated from a magnetically soft or ferromagnetic material.

The main seat seal 45 cooperating with the main valve seat 32 is preferably made of PCTFE, PTFE, PEEK or a different material having similar properties.

According to a further embodiment which is not represented, the main valve actuator is omitted. Either the piston is made of a magnetically soft material which is then laterally caught by a permanent magnet, or the piston remains of stainless steel and is connected to a core of magnetically soft material which is then held by the permanent magnet after opening.

The lateral opening in the fluid housing 12 is then closed by a lid in the place where the second valve actuator is otherwise arranged.

To return the main valve element to the closed position, a mechanical release mechanism may be used to manually release the main valve element from the open position again, if required.

Alternatively, a release mechanism can be completely omitted such that the safety valve has to be replaced once it has been activated, i.e. opened.

The invention claimed is:

1. A safety valve comprising a fluid housing having a fluid inlet and a fluid outlet, a pilot valve element cooperating with a pilot valve seat, a pilot valve actuator comprising a pilot coil and a moveable core of ferromagnetic material, a main valve element cooperating with a main valve seat in order to interrupt and open a fluid connection between the fluid inlet and the fluid outlet, wherein the pilot valve seat and the main valve seat are arranged in the fluid housing, a permanent magnet which is associated with the main valve element and is adapted to hold the main valve element in an open position, and a main valve actuator cooperating with the main valve element, wherein the main valve actuator comprises a solenoid coil, a movable core of ferromagnetic material, a fixed plug of ferromagnetic material, a yoke and the permanent magnet, and wherein the pilot valve element cooperates with the pilot valve seat to realize along with fluid ducts in the fluid housing a pilot valve for opening the main valve, and wherein the pilot valve actuator indirectly cooperates with the main valve element via a pilot duct and the main valve actuator directly cooperates with the main valve element.

2. The safety valve according to claim 1, wherein the fluid ducts in the fluid housing are the pilot duct, a relief bore and a pressure compensation hole which fluidly connect the fluid outlet with a valve chamber in which the main valve element is displaceable arranged such that medium can flow off behind the main valve element when the pilot valve is open in order to move the main valve element away from the main valve seat, thereby opening the main valve.

3. The safety valve according to claim 1, wherein a direction of movement of the main valve element is parallel to a direction of movement of the core of the main valve actuator and perpendicular to a direction of movement of the core of the pilot valve actuator.

4. The safety valve according to claim 1, wherein the main valve element is rigidly coupled to the core of the main valve actuator.

5. The safety valve according to claim 1, wherein the main valve element is flexibly coupled to the core of the main valve actuator.

6. The safety valve according to claim 1, wherein a driving mechanism acting in only one direction is arranged between the main valve element and a core of the main valve element.

7. The safety valve according to claim 1, wherein the main valve element is made of a ferromagnetic material or is firmly connected to a component made of a ferromagnetic material.

8. The safety valve according to claim 1, wherein no separate mechanical release mechanism is provided to open the main valve other than use of the pilot valve actuator.

9. A safety valve comprising a fluid housing having a fluid inlet and a fluid outlet, a pilot valve element cooperating with a pilot valve seat, a pilot valve actuator comprising a pilot coil and a moveable core of ferromagnetic material, a main valve element cooperating with a main valve seat in order to interrupt and open a fluid connection between the fluid inlet and the fluid outlet, wherein the pilot valve seat and the main valve seat are arranged in the fluid housing, and a permanent magnet which is associated with the main valve element and is adapted to hold the main valve element in an open position, a main valve actuator cooperating with the main valve element being provided, wherein the safety valve is configured such that after a first switching of the pilot valve to open the pilot valve, the main valve seat is opened and then remains open until the main actuator is actuated, regardless of whether the pilot valve seat still remains open or is closed.

10. A safety valve comprising a fluid housing having a fluid inlet and a fluid outlet, a pilot valve element cooperating with a pilot valve seat, a pilot valve actuator comprising a pilot coil and a moveable core of ferromagnetic material, a main valve element cooperating with a main valve seat in order to interrupt and open a fluid connection between the fluid inlet and the fluid outlet, wherein the pilot valve seat and the main valve seat are arranged in the fluid housing, and a permanent magnet which is associated with the main valve element and is adapted to hold the main valve element in an open position, a main valve actuator cooperating with the main valve element being provided, wherein the pilot valve actuator is configured for only opening the fluid connection between the fluid inlet and the fluid outlet and the main valve actuator is configured such that when the main valve actuator is supplied with a current, the main valve actuator acts against a magnetic force of the permanent magnet such that the fluid connection between the fluid inlet and the fluid outlet is closed.

\* \* \* \* \*